United States Patent [19]

Kohler

[11] 4,032,197

[45] June 28, 1977

[54] SLIP/SLIDE DETECTOR CONTROL CIRCUIT

[75] Inventor: William H. Kohler, Ringwood, N.J.

[73] Assignee: Abex Corporation, New York, N.Y.

[22] Filed: May 4, 1976

[21] Appl. No.: 682,916

[52] U.S. Cl. .............................. 303/96; 180/82 R; 303/20; 361/242

[51] Int. Cl.² ......................................... B60T 8/10

[58] Field of Search .............. 180/82 R; 188/181 C; 303/20, 91, 96, 106, 109, 111; 317/5; 324/161; 340/53, 62; 318/52

[56] References Cited

UNITED STATES PATENTS

| | | | |
|---|---|---|---|
| 3,610,703 | 10/1971 | Slavin et al. | 303/106 |
| 3,640,586 | 2/1972 | Kohler | 303/91 |
| 3,866,979 | 2/1975 | Rabus et al. | 303/106 X |
| 3,912,034 | 10/1975 | Pallof | 303/96 X |
| 3,966,267 | 6/1976 | McNinch, Jr. et al. | 303/106 |

*Primary Examiner*—Stephen G. Kunin
*Attorney, Agent, or Firm*—Kinzer, Plyer, Dorn & McEachran

[57] ABSTRACT

A vehicle friction brake control system applicable in both brake and power modes for controlling slip and slide of the vehicle wheels utilizes a speed signal for each vehicle axle whose amplitude is dependent upon axle angular speed. There is a front axle speed comparison circuit and a rear axle speed comparison circuit. Each of the speed comparison circuits utilize speed signals from their respective axles, as well as electrically isolated speed signals from the other axles. The speed comparison circuits each compare the highest or lowest axle speed from their respective axles with the highest or lowest of all four axle speeds to provide a slip/brake system signal.

13 Claims, 3 Drawing Figures

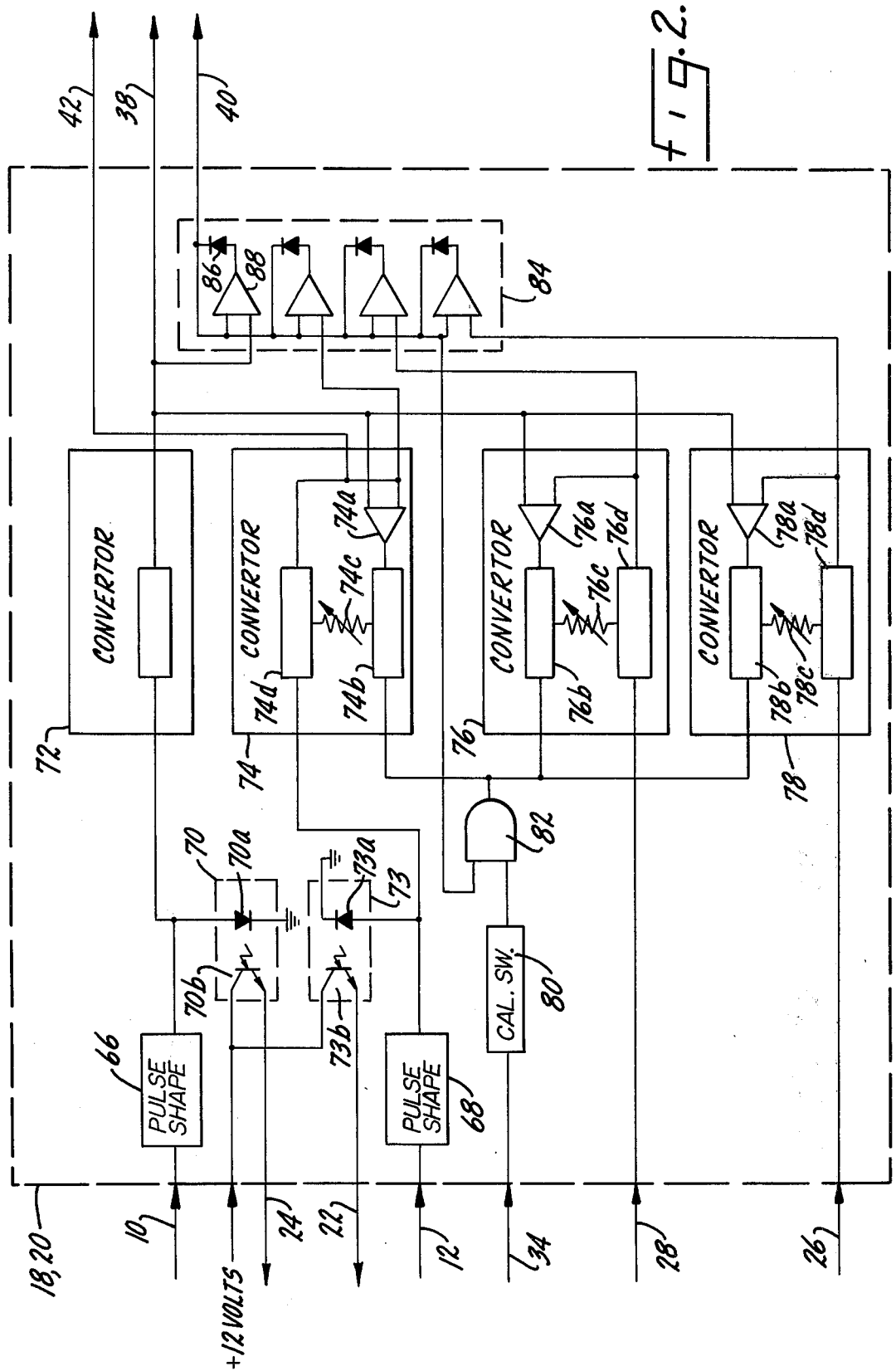

SLIP/SLIDE DETECTOR CONTROL CIRCUIT

SUMMARY OF THE INVENTION

The present invention relates to a slip/slide detector for use on vehicles, for example transit cars and has particular reference to such a system in which there are independent slip detectors for the front axles and for the rear axles.

Another purpose is a brake control system of the type described providing electrical isolation between the control circuits for the front and rear axles.

Another purpose is a control system of the type described using optical coupling between the control circuits for the front and rear axles.

Another purpose is a brake control system comparison circuit in which each input utilizes the parallel combination of a diode and amplifier to eliminate diode voltage loss.

Another purpose is a slip/slide detector circuit which limits the change in acceleration or deceleration if all four axles are either slipping or sliding.

Another purpose is a system of the type described including means for varying the reduction of brake cylinder pressure as a function of slip.

Other purposes will appear in the ensuing specification, drawings and claims.

BRIEF DESCRIPTION OF THE DRAWINGS

The invention is illustrated diagrammatically in the following drawings wherein:

FIG. 2 is a detailed electrical diagram of one of the tachometer amplifier circuits.

DESCRIPTION OF THE PREFERRED EMBODIMENT

Figure 1:
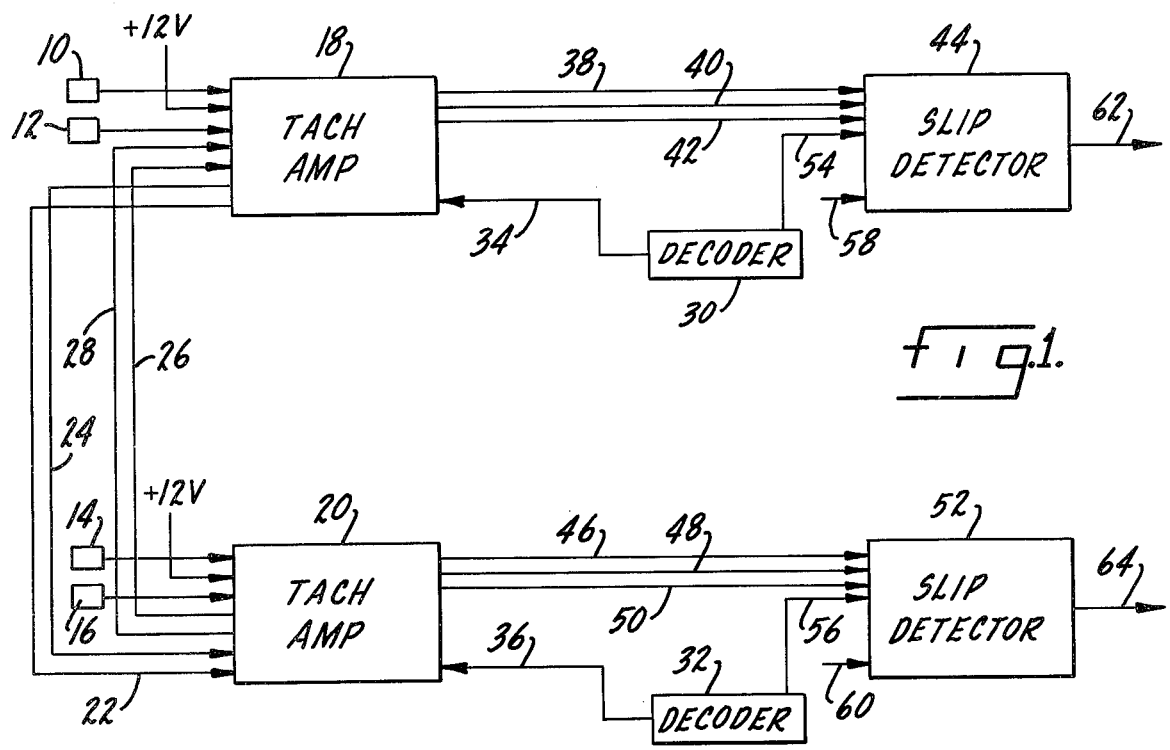
FIG. 1 is a block diagram of a system of the type described.

The present invention is directed to a slip/slide detector circuit for use on transit vehicles of the type found in subways and above-ground transit systems, and is an improvement on the circuit shown in my prior U.S. Pat. No. 3,640,586. Specifically, the present invention provides slip/slide detector circuits for the front and rear trucks of a transit vehicle, which detector circuits are electrically isolated from each other, but yet utilize axle speed signals from all four vehicle axles in determining whether a slip or slide condition exists when the vehicle is in either the power or brake modes of operation.

It should be understood that in a transit vehicle with four axles, two in the front truck and two in the rear truck, there will be a tachometer pulse generator operatively associated with each axle, which tachometer will provide a pulse train whose frequency is representative of the angular speed of the axle and its associated wheels. The front axle tachometer pulse generating means are indicated at 10 and 12, with the rear axle tachometer pulse generating means being indicated at 14 and 16. Front axle tach generators 10 and 12 provide direct inputs for front axle tach amplifier circuit 18 and in like manner rear axle tach generators 14 and 16 provide direct inputs for rear axle tach amplifier circuit 20. After the above-described inputs have been appropriately shaped within the amplifier circuits 18 and 20, as will be described hereinafter, they are optically coupled to the opposite amplifier circuit. The front axle signals representative of axle speed are connected by lines 22 and 24 to rear axle amplifier circuit 20 and the rear axle signals are in like manner coupled on lines 26 and 28 to front tach amplifier circuit 18.

A power brake decoder 30 is provided for the front axle detector system and in like manner a power brake decoder 32 is provided for the rear axle detection system. It should be understood that the front and rear axle detection systems are identical and operate in like manner to control respectively the front and rear trucks of the vehicle. Decoders 30 and 32 have outputs on lines 34 and 36, respectively, connected to front and rear amplifier circuits 18 and 20

Front amplifier circuit 18 has three outputs, on lines 38, 40 and 42, respectively, connected to a slip detector circuit 44. In like manner, rear amplifier circuit 20 has outputs on lines 46, 48 and 50 connected to a rear slip detector circuit 52. Front power brake decoder 30 has an output on line 54 to slip detector 44 and in like manner rear power brake decoder 32 has an output on line 56 to rear slip detector 52. The front and rear slip detector circuits 44 and 52 have brake release inputs 58 and 60, respectively, and each have outputs on lines 62 and 64, respectively, which outputs are used to control the amount of pressure applied at the brake cylinders, thus controlling acceleration and deceleration of the vehicle so as to substantially eliminate slip and slide conditions.

As the front and rear truck electrical systems are identical, only one such system will be described in detail. However, as the systems are interrelated, as described above, the relationship between the two systems will be set forth. Amplifier circuit 18 (FIG. 2), as described, has tach inputs 10 and 12, which provide a series of pulses, of slightly varying amplitude, whose frequency is directly related to the angular speed of the vehicle axles and wheels. Input 10 passes through a pulse shaping network 66 which provides carefully shaped pulses of constant amplitude. In like manner, pulse shaping network 68 is connected to tach input 12. The output from pulse shaping network 66 goes to an optical coupler 70 and to a fixed gain frequency to analog converter 72. The output from pulse shaping network 68 goes to an optical coupler 73 and to an adjustable gain frequency to analog converter 74.

Optical couplers 70 and 73 each include photodiodes 70a and 73a which are positioned adjacent phototransistors 70b and 73b. Thus, the optical couplers provide electrical isolation between the front and rear amplifier circuits, but yet provide a means for coupling tachometer signals between the respective circuits. The output from optical couplers 70 and 73 is directed to amplifier circuit 20 along lines 22 and 24 as described above.

Lines 26 and 28 providing inputs for amplifier circuit 18 will carry signals representative of the angular speed of the rear axles and will be taken from tach generators 14 and 16 coupled by means of the same type of optical coupler as described above. The signal from tach generator 14 will be connected to an adjustable gain frequency to analog converter 76, and the signal from tach generator 16 will be connected in the manner described to adjustable gain frequency to analog converter 78.

The signal from power brake decoder 30, along line 34, will be connected to a calibration switch 80 whose output in turn is connected to an AND gate 82. The other input for AND gate 82 will be derived from the output of comparator 84 which provides a signal indicating that there is a non-zero speed condition. Calibration switch 80 is operable to provide a gating signal for AND gate 82 at such time as a power mode has been completed and prior to the application of the vehicle brakes.

As described in the above-mentioned U.S. patent, it is necessary to compensate for variations in wheel size in order to provide an accurate slip/slide detector. Accordingly, the output from converter 72, having a fixed gain, is connected to error amplifiers 74a, 76a and 78a. Outputs from the error amplifiers in turn are each connected to sample and hold circuits 74b, 76b and 78b. An adjustable resistor is utilized in the converters and said resistors are designated at 74c, 76c and 78c, with each of the resistors being connected between the sample and hold circuits and the actual converter circuits which are indicated at 74d 76d, and 78d. This portion of the circuit is described in detail in the above-mentioned U.S. patent. Subsequent to a power cycle, or between the power and brake cycles, the calibration switch provides an input to AND gate 82 and an output from comparator 84 permits the error amplifiers to adjust the variable resistors connected to the converters to accomodate any variation in wheel size.

Comparator 84 receives inputs from converters 72, 74, 76 and 78. Each of those inputs are connected to the parallel combination of a diode and an amplifier, said elements being respectively designated at 86 and 88. The described combination of a diode and an amplifier provides what is known as a perfect diode in that the amplifier eliminates the inherent loss of the diode so that the diode output voltage is the same as the diode input voltage. The outputs from the described parallel combinations have a common connection such that the output from comparator 84 is equal to the highest voltage input, with this output being provided on line 40 in FIG. 1. Although the system will be described as using the highest voltage output from comparator 84, it is equally satisfactory to use the lowest voltage output in which case the diodes would have the reverse connection.

Figure 3:
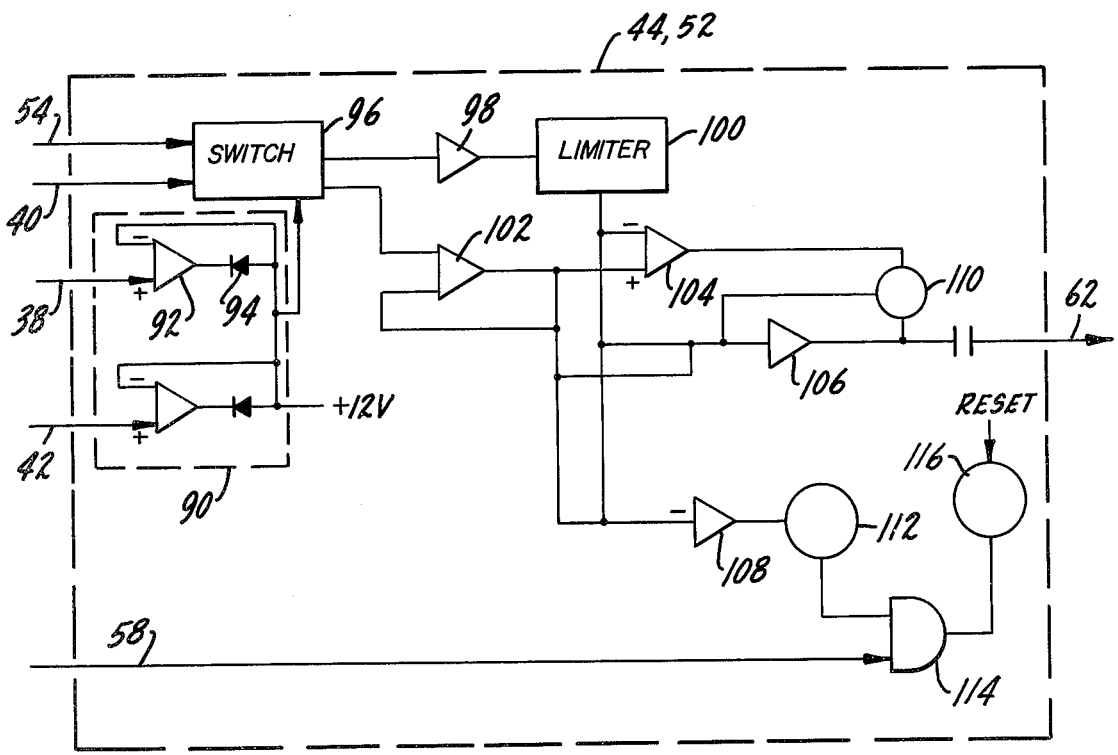
FIG. 3 is a detailed electrical diagram of one of the slip detector circuits.

Output lines 38, 40 and 42 will provide respectively a signal representative of tach 10 input, the highest tach signal taken from all four axles and a signal indicative of tach 12 input. The tach 10 and tach 12 signals are connected to a comparator 90 in FIG. 3 which again is a perfect diode comparator and includes the parallel combination of amplifiers 92 and diodes 94. Note that in this case the diodes are connected in the reverse manner from that shown in FIG. 2 so that the output will be the lowest input. If, as described above, the lowest tach output from comparator 84 is utilized, then comparator 90 would be reversed and the highest output would be the resultant utilized signal.

An electronic switch 96 has one input from comparator 90, one input on line 40 representative of the highest tach signal from comparator 84, and a third input on line 54 from power brake decoder 30. The signal from decoder 30 merely indicates whether the vehicle is operating in a brake or power mode, thus determining whether switch 96 utilizes the output from comparator 90 or the output from the comparator 84 as its reference. For example, if the system is operating in a power mode, slippage will be indicated by the highest tach output, whereas, if the system is in the brake mode, sliding would be indicated by the lowest tach output. Assuming the system is operating in the brake mode, the reference will be the highest tach output and this is connected through a buffer amplifier 98 to a rate limiter 100. The other output from switch 96 is connected to a buffer/amplifier 102.

The output from rate limiter 100 is connected to a gain control amplifier 104, to a slip detector amplifier 106, as well as an emergency control amplifier 108. Each of the above-described amplifiers similarly have inputs from buffer/amplifier 102. Rate limiter 100 is effective only when all four axles are slipping to limit its output to that representative of the greatest permissible vehicle deceleration. For example, rate limiter 100 may be set for a maximum vehicle deceleration of 5.5 mph/second. Assuming operation in the brake mode, the reference signal from buffer/amplifier 98 normally will pass through the rate limiter, where it is inverted, and thus be compared against a signal of opposite polarity from buffer 102 in amplifiers 104, 106 and 108. Only when all four axles are slipping does rate limiter 100 effectively limit car deceleration. Slip detector amplifier 106 will provide an output which is utilized to control the reduction of brake cylinder pressure as a function of slip, with this output being provided along line 62. The difference between the positive and negative signals at its input are indicative of the degree of slip, or slide, assuming the power mode. In reality, during a braking operation there will always be some degree of slip, the intent of the present circuit is to minimize the degree of slip to within permissible limits. Thus, the application of braking pressure is controlled in accordance with the amount of slip which is determined by the output from slip detector amplifier 106.

Gain control amplifier 104 receives the same inputs as slip detector amplifier 106. When the degree of slip is sufficient to cause conduction of transistor 110 connected to the output of amplifier 104, the gain of slip detector amplifier 106 will be increased so as to change the rate of reduction of brake cylinder pressure as a function of slip. Thus, under normal slip or slide conditions, amplifier 106 will be operating with a certain gain and thus the relationship between slip and reduction in brake cylinder pressure will be linear. However if the slip increases beyond a predetermined range or limit, it is necessary to increase the gain of the amplifier to change the linear relationship between slip and brake cylinder pressure. This is because the coefficient of adhesion may rapidly decrease if the change in slip increases beyond a certain point. Thus, it is desirable to operate with a minimum of slip and if the slip becomes too high it is necessary to more rapidly reduce brake cylinder pressure as a function of slip.

The output of amplifier 108 is connected to a relay 112 whose output is connected to an AND gate 114. Relay 112 will control the application of dynamic braking. AND gate 114 also receives a brake release signal on line 58. Thus, if the output from amplifier 108 reaches a predetermined level, causing relay 112 to operate, and assuming the brakes are released, AND gate 114 will cause operation of a relay 116 which in turn will automatically eliminate the above-described brake control signal. Relay 116 will be operated when there is a large degree of slip and no brake cylinder pressure. For a predetermined period of time this combination of events, indicating an emergency situation, should in turn cause the removal of the brake control signal to permit a full brake application.

An important feature of the invention is the electrical isolation between the front and rear amplifier circuits. A failure in either circuit will still permit the application of brakes to the axles controlled by the other circuit. However, signals indicative of wheel and axle speed of all four axles are used as a basis of comparison to determine if a slip or slide condition exists. The electrical isolation may be accomplished in many ways, however, the preferred manner is through the use of the described optical coupling. There may be individual power supplies for each of the amplifier circuits so as to further provide for their independence in the event of a failure of one or the other.

It is highly advantageous to use the perfect diode comparison circuits in that it eliminates the loss inherent in a normal diode. Since the system described will be operating in the range of a few volts, the normal loss of a diode, which may be in the area of a fraction of a volt, could be indicative of a substantial change in the speed of one or more axles.

Since the coefficient of adhesion between wheels and rails may rapidly decrease as slip increases, it is necessary to operate with one relationship between slip and brake cylinder pressure for a certain range of slip, and a different relationship between slip and brake cylinder pressure if the slip increases beyond a certain point.

Whereas the preferred form of the invention has been shown and described herein, it should be realized that there may be many modifications, substitutions and alterations thereto.

The embodiments of the invention in which an exclusive property or privilege is claimed are defined as follows:

1. In a friction brake control system for a vehicle having two front and two rear axles, means for providing a speed signal for each axle having a variable dependent upon axle angular speed, front axle speed comparison means having direct inputs from said from axle speed signal means and electrically discontinuous and isolated inputs from said rear axle speed signal means and an output representing either the highest or lowest axle speed of the front and rear axles, and means for comparing the front axle speed comparison means output with said front axle speed signals to provide a slip/slide control signal.

2. The system of claim 1 further characterized by and including rear axle speed comparison means having direct inputs from said rear axle speed signal means and electrically discontinuous and isolated inputs from said front axle speed signal means and an output representing either the highest or lowest axle speed of the front and rear axles, and means for comparing the rear axle speed comparison means output with said rear axle speed signals to provide a slip/slide control signal.

3. The system of claim 2 further characterized by and including optical coupling means connecting said rear axle speed signal means with said front axle speed comparison means and optical coupling means connecting said front axle speed signal means with said rear axle speed signal comparison means.

4. The system of claim 3 further characterized in that each of said coupling means includes a phototransistor and a photodiode.

5. The system of claim 2 further characterized in that said front and rear axle speed comparison means each include, for each input, the parallel combination of an amplifier and a diode.

6. The system of claim 2 further characterized in that said front and rear axle speed signal means each include means for providing a speed signal whose frequency is dependent upon axle angular speed, and means for converting said frequency variable signal to an amplitude varying signal.

7. The system of claim 6 further characterized in that the frequency to analog conversion means includes means for adjusting the gain thereof to compensate for differences in wheel size.

8. The system of claim 1 further characterized in that said means for comparing said fron axle speed comparison means output with said front axle speed signals to provide a slip/slide control signal includes reversing switch means to provide such control signal in both the brake and power modes of operation.

9. The system of claim 8 further characterized by and including a power brake decoder having an output connected to said reversing switch means, another output for said reversing switch means being provided by said front axle speed comparison means.

10. The system of claim 9 further characterized by and including means for comparing said front axle speed signals and connecting either the highest or lowest thereof to said reversing switch means.

11. The system of claim 1 further characterized in that said means for comparing said front axle speed comparison means output with said front axle speed signals to provide a slip/slide control signal includes means for limiting the rate of change in vehicle acceleration or deceleration as controlled by said slip/slide control signal.

12. The system of claim 1 further characterized in that said means for comparing said front axle speed comparison means output with said front axle speed signals to provide a slip/slide control signal includes amplifier means responsive to the difference between said comparison means output and the highest or lowest of said front axle speed signals.

13. The system of claim 12 further characterized by and including means for changing the gain of said amplifier in accordance with the magnitude of said difference.

* * * * *